(12) United States Patent
Hoshino et al.

(10) Patent No.: US 8,322,753 B2
(45) Date of Patent: Dec. 4, 2012

(54) IDENTIFICATION MEDIUM, IDENTIFICATION METHOD, AND IDENTIFICATION APPARATUS

(75) Inventors: Hidekazu Hoshino, Yokohama (JP); Itsuo Takeuchi, Yokohama (JP); Tokio Sakauchi, Yokohama (JP); Suzushi Nishimura, Yokohama (JP); Gorou Suzaki, Yokohama (JP)

(73) Assignees: NHK Spring Co., Ltd., Yokohama (JP); Nippon Oil Corporation, Tokyo (JP)

( * ) Notice: Subject to any disclaimer, the term of this patent is extended or adjusted under 35 U.S.C. 154(b) by 737 days.

(21) Appl. No.: 12/312,653

(22) PCT Filed: Oct. 18, 2007

(86) PCT No.: PCT/JP2007/070325
§ 371 (c)(1),
(2), (4) Date: Jun. 3, 2009

(87) PCT Pub. No.: WO2008/062620
PCT Pub. Date: May 29, 2008

(65) Prior Publication Data
US 2010/0026450 A1    Feb. 4, 2010

(30) Foreign Application Priority Data

Nov. 22, 2006 (JP) ................................. 2006-315743

(51) Int. Cl.
*B42D 15/00* (2006.01)
(52) U.S. Cl. ............... 283/91; 283/90; 283/86; 283/115
(58) Field of Classification Search .................... 283/90, 283/91, 114, 86
See application file for complete search history.

(56) References Cited

U.S. PATENT DOCUMENTS

| | | | |
|---|---|---|---|
| 6,628,439 B2 * | 9/2003 | Shiozawa et al. ............... 283/86 |
| 2003/0133098 A1 * | 7/2003 | Hoshino et al. ................. 283/90 |
| 2006/0023157 A1 | 2/2006 | Hammond-Smith et al. |
| 2007/0037290 A1 | 2/2007 | Hoshino et al. |
| 2008/0054621 A1 | 3/2008 | Burchard et al. |
| 2008/0136979 A1 | 6/2008 | Hoshino et al. |
| 2008/0138543 A1 | 6/2008 | Hoshino et al. |

FOREIGN PATENT DOCUMENTS

| | | |
|---|---|---|
| CA | 2032587 | 6/1991 |
| DE | 103 43 547 A1 | 4/2005 |
| DE | 10 2004 039 355 A1 | 2/2006 |
| DE | 10 2004 051 919 A1 | 4/2006 |
| GB | 2 328 180 A | 2/1999 |

(Continued)

OTHER PUBLICATIONS

Extended European Search Report issued in European Application No. 07830059.7 on Dec. 14, 2010.

*Primary Examiner* — Dana Ross
*Assistant Examiner* — Kyle Grabowski
(74) *Attorney, Agent, or Firm* — Oliff & Berridge, PLC

(57) ABSTRACT

An identification medium is to be observed via a linearly polarizing filter and includes a first liquid crystal layer that changes the wavelength of light according to the rotational angle of the linearly polarizing filter, a cholesteric liquid crystal layer, and a light absorbing layer that is provided below the cholesteric liquid crystal layer.

9 Claims, 6 Drawing Sheets

FOREIGN PATENT DOCUMENTS

| | | |
|---|---|---|
| JP | A-63-51193 | 3/1988 |
| JP | A-4-144796 | 5/1992 |
| JP | A-2000-19323 | 1/2000 |
| JP | A-2003-186377 | 7/2003 |
| JP | A-2004-358869 | 12/2004 |
| JP | A-2005-134490 | 5/2005 |
| JP | A-2006-28672 | 2/2006 |
| JP | A-2006-215477 | 8/2006 |
| WO | WO03091953 * | 11/2003 |
| WO | WO 2004/025337 A1 | 3/2004 |
| WO | WO 2006/068180 A1 | 6/2006 |

* cited by examiner

Direct observation

Observation via viewer of which linearly polarizing plate faces toward this side Observation via viewer of which quarter-wavelength plate faces toward this side

IDENTIFICATION MEDIUM, IDENTIFICATION METHOD, AND IDENTIFICATION APPARATUS

TECHNICAL FIELD

The present invention relates to an identification medium that allows determination of whether or not articles are authentic by use of visual effects, and in particular, relates to an identification medium that exhibits unique appearances by use of a polarizing filter.

BACKGROUND ART

For articles such as goods and items of clothing, imitations in which the appearances are similar to that of genuine articles are being manufactured and sold. In such a situation, in order to guarantee performance, trust, or security, and to maintain brand strength of such articles, techniques for determining the authenticity of articles are required.

As techniques for determining the authenticity of articles, for example, methods of printing special ink on articles, or methods of adhering special small pieces having optical reflective characteristics on articles, are known.

In methods of printing with special ink, predetermined characters and patterns are printed using ink that fluoresces under ultraviolet light. When ultraviolet light is irradiated, the characters and the patterns appear at the surface of the articles, and the authenticity of articles is confirmed. Moreover, the following method is also known. Magnetic material particles or particles having magnetic properties are mixed with ink, and articles have the ink applied thereto. Then, a magnetic sensor is used to determine the authenticity of the articles.

Furthermore, as the small pieces having optical reflective characteristics, the one of using optical characteristics of a hologram or a cholesteric liquid crystal are known. In regard to this technique, for example, Japanese Unexamined Patent Application Publication No. 63-51193 or Japanese Unexamined Patent Application Publication No. 4-144796 is known.

DISCLOSURE OF INVENTION

However, products similar to such special ink can be easily obtained, and therefore the anticounterfeiting effects are inadequate. Moreover, in holograms for directly viewing by the eye, the quality of counterfeits is high, and judgments about authenticity by appearance is difficult. Therefore, it is difficult to determine authenticity only by a hologram.

Moreover, under the circumstances in which counterfeiting techniques have advanced, also in regard to the identification medium having cholesteric liquid crystals, anticounterfeiting effects and superior identification performance are desired.

Therefore, an object of the present invention is to provide an identification medium in which the anticounterfeiting effects are higher than conventionally, and in which the determination is carried out easily and reliably.

The identification medium of the present invention, which is observed via a linearly polarizing filter, comprises a first liquid crystal layer that changes a wavelength of light according to a rotational angle of the linearly polarizing filter; a cholesteric liquid crystal layer; and a light absorbing layer provided below the cholesteric liquid crystal layer.

In the above-mentioned composition, the first liquid crystal layer comprises at least one twisted nematic liquid crystal layer, in which a product by multiplying a birefringent value and a spiral pitch of liquid crystal molecules in the liquid crystal layer is greater than at least 3.5 times the wavelength of light having a wavelength of 400 nm to 800 nm and in which the selective reflection by the Bragg diffraction is not caused, and a reflection layer. In the observation via the linearly polarizing filter, when the linearly polarizing filter is rotated, the first liquid crystal layer can be observed with change of coloration.

The optical characteristics of this first liquid crystal layer are described hereinafter. In the present description, the twisted nematic liquid crystal and the cholesteric liquid crystal are distinguished as follows. The twisted nematic liquid crystal has an orientation structure in which axes of liquid crystal molecules controllably turn in a certain direction so that anisotropy is exhibited macroscopically, and in which the liquid crystal molecules form a spiral structure around an axis (spiral axis) perpendicular to the layer. Moreover, the twisted nematic liquid crystal almost meets the Mauguin condition in visible light having a wavelength of 400 nm to 800 nm, and does not cause Bragg reflection. The cholesteric liquid crystal has an orientation structure in which axes of liquid crystal molecules controllably turn in a certain direction so that anisotropy is exhibited macroscopically, and in which the liquid crystal molecules form a spiral structure around the spiral axis. However, the cholesteric liquid crystal does not satisfy the Mauguin condition in visible light having a wavelength of 400 nm to 800 nm and causes Bragg reflection. Therefore, the twisted nematic liquid crystal and the cholesteric liquid crystal have the same orientation structure, but these liquid crystals are distinguished in the point of having different optical characteristics.

Moreover, in the present description, the spiral pitch is a length perpendicular to the layer necessary for the twisted nematic liquid crystal molecules or the cholesteric liquid crystal molecules to be rotated by 360° around the spiral axis.

The Mauguin condition is a condition in which linearly polarized light entering in parallel or perpendicularly to long axes of liquid crystal molecules can pass through along the spiral structure of the liquid crystal molecules with the linearly polarized light maintained in the polarized state, when the product by multiplying the birefringent value and the spiral pitch of liquid crystal molecules is sufficiently greater than the wavelength of the light. The birefringent value is a difference of refractive indexes between an extraordinary ray and an ordinary ray.

In general, when a birefringent medium having optical anisotropy in the side is placed on a reflecting plate, coloration is observed via a polarizing filter. When light passes through the polarizing filter, the light is converted into linearly polarized light. When the linearly polarized light passes through the birefringent medium, a phase difference between two orthogonal polarized components is caused so that the linearly polarized light is converted into elliptically polarized light. In this case, the phase differences is different in each wavelength of light, and an ellipticity of the elliptically polarized light is different, and therefore the coloration is observed.

In this case, the coloration (color) is determined by the thickness (or retardation) of the birefringent medium, and the density (chroma) of color is determined by an angle between a fast axis (or a slow axis) of the birefringent medium and a passage axis (or absorption axis) of the polarizing filter. According to Japanese Unexamined Patent Application Publication No. 2000-019323, when the angle between a fast axis (or a slow axis) of the birefringent medium and a passage axis (or an absorption axis) of the polarizing filter is parallel or orthogonal, the chroma is the highest. When the angle is 45°, the chroma is the lowest.

However, in order to change the coloration by the composition of the reflecting plate, the birefringent medium, and the polarizing filter, the thickness of the birefringent medium must be changed. In an identification medium used as seals and labels, the thickness of the birefringent medium cannot be substantially changed after the identification medium is affixed on articles.

In the present invention, a predetermined color is generated according to the angle of the polarizing filter used for the observation. Moreover, authenticity can be easily confirmed by prescribing the angle of the polarizing filter and the generated color. Furthermore, the identification medium is colorlessness and is invisible as long as the polarizing filter is not used.

In the composition of the reflecting plate, the birefringent medium, and the polarizing filter, a cause of the coloration not being determined by the angle between a fast axis (or a slow axis) of the birefringent medium and a passage axis (or an absorption axis) of the polarizing filter was analyzed. As a result, although the ellipticity of the elliptically polarized light changed by the birefringent medium in each wavelength, the direction of the long axis of the elliptically polarized light did not depend on the wavelength of light and was constant. Therefore, if not only the ellipticity but also the direction of the long axis of the elliptically polarized light can be changed, the coloration can be changed according to the angle between a fast axis (or a slow axis) of the birefringent medium and a passage axis (or an absorption axis) of the polarizing filter.

The present invention is composed of the reflecting plate, the twisted nematic liquid crystal layer, and the polarizing filter. The twisted nematic liquid crystal layer acts as a layer for converting into elliptically polarized light and rotating the direction of the long axis of the elliptically polarized light. That is, in this composition, nonpolarized light is converted into polarized light by the polarizing filter, and the polarized light enters into the twisted nematic liquid crystal layer. When the polarized light passes through the twisted nematic liquid crystal layer, ellipticity of the polarized light changes according to thickness of the twisted nematic liquid crystal layer. At the same time, the direction of the long axis of the elliptically polarized light rotates according to the twisted angle. The change of ellipticity and rotational angle of the long axis is different according to the wavelength of light. The light that is being output from the twisted nematic liquid crystal layer is reflected by the reflection layer, and it enters again into the twisted nematic liquid crystal layer. The light output from the twisted nematic liquid crystal layer passes through the polarizing filter, and is observed. In this case, the ellipticity is different according to the wavelength of light, so that the intensity of light passing through the polarizing filter is different for each wavelength. Therefore, the coloration is generated. Moreover, the direction of the long axis of the elliptically polarized light is different for each wavelength. Therefore, the more parallel the passage axis of the polarizing filter and the direction of long axis of the elliptically polarized light, the greater the amount of light passing through the polarizing filter. The more orthogonal the passage axis of the polarizing filter and the direction of long axis of the elliptically polarized light, the greater the amount of light passing through the polarizing filter. That is, the coloration (color) changes by rotating the polarizing filter.

As mentioned above, it is important that the twisted nematic liquid crystal layer change not only the ellipticity of the elliptically polarized light, but also the direction of long axis of the elliptically polarized light. The rotation of the long axis of the elliptically polarized light, that is, the optical rotating power, preferably almost satisfies the Mauguin condition. That is, the product by multiplying the birefringent value (difference of refractive indexes between an extraordinary ray and an ordinary ray) and the spiral pitch of liquid crystal molecules should be sufficiently greater than the wavelength of the light. The product is preferably more than 3 times the wavelength of the light, and is more preferably more than 3.5 times the wavelength of the light. When the product is less than 3 times the wavelength of the light, especially when the wavelength of the light is shorter, the optical rotating power is lost. Therefore, the polarized light cannot rotate around the spiral axis of the twisted nematic liquid crystal.

The cholesteric liquid crystal layer is a liquid crystal layer that selectively reflects right-handed or left-handed circularly polarized light having a predetermined center wavelength when natural light enters thereinto. The cholesteric liquid crystal layer has a laminated structure. In one layer, long axes of liquid crystal molecules have the same orientation, and are parallel to the plane of the layer. The directions of the orientation differ slightly with respect to the adjacent layer, and the layers are stacked with the orientations rotated in a three-dimensional spiral structure overall. In this structure, in a direction perpendicular to the layer, pitch P is a distance necessary for the molecular long axis to be rotated through 360° and return to the initial state, and an average refraction index of the respective layers is index n. In this case, the cholesteric liquid crystal layer selectively reflects circularly polarized light having a center wavelength $\lambda s$ satisfying the equation $\lambda s = n \times P$ and having a predetermined turning direction. That is, when white light, which does not have uniformly polarized components and which does not have uniform wavelength components, enters into the cholesteric liquid crystal layer, right-handed or left-handed circularly polarized light having a predetermined center wavelength is selectively reflected. In this case, circularly polarized light having a turning direction opposite to that of the reflected circularly polarized light having the same wavelength of $\lambda s$, and natural light having other wavelengths, pass through the cholesteric liquid crystal layer.

The turning direction (rotational direction) of the reflected circularly polarized light is selected by setting a spiral direction of the cholesteric liquid crystal layer. That is, when the long axes are seen from the incident direction of light, by selecting either the spiral direction in which the molecular long axes in each layer is orientated clockwise or counterclockwise, the turning direction (rotational direction) of the reflected circularly polarized light is selected.

The cholesteric liquid crystal shows an optical characteristic called "color shifting" in which the color changes according to the viewing angle. This is because the pitch P apparently decreases when the viewing angle increases, and the center wavelength $\lambda s$ shifts toward a shorter wavelength. For example, when a cholesteric liquid crystal is observed from a vertical direction, the reflected color thereof is red, and it is observed to shift to orange, yellow, green, and blue in turn as the viewing angle increases. It should be noted that the viewing angle is defined as the angle formed by a visual line and a vertical line against the surface of the identification medium.

When the above-mentioned identification medium having the composition of the present invention is observed via a special optical filter (viewer) having a structure in which is laminated a linearly polarizing plate and a quarter-wavelength plate, superior identification performance can be obtained. That is, in a case of observing the identification medium of the present invention via the viewer in which one side faces toward the identification medium, and in a case of observing the identification medium of the present invention via the viewer in which the other side faces toward the identification medium, different patterns can be observed. As a result, identification can be carried out for determining authenticity. This identification is based on remarkable differences in appearance among the direct observation and the above-mentioned two observation methods, and highly reliable determination of authenticity can be carried out.

The quarter-wavelength plate is a birefringent element (optical element showing a birefringent effect) that generates a phase difference of 90° (p/2) between orthogonal linearly polarized components when light passes therethrough. When linearly polarized light enters into the quarter-wavelength plate, it is converted into circularly polarized light. When circularly polarized light enters into the quarter-wavelength plate, it is converted into linearly polarized light.

An identification principle of the present invention is described hereinafter. FIGS. 1A and 1B are schematic views for explaining a part of the principle of the present invention. FIGS. 1A and 1B schematically show a state in a case of observing a cholesteric liquid crystal layer 103 via a viewer (optical filter) 100 having a structure in which is laminated a linearly polarizing plate 101 and a quarter-wavelength plate 102. In the FIGS. 1A and 1B, although the linearly polarizing plate 101 is separated from the quarter-wavelength plate 102, the two closely adhere in actuality. In addition, the viewer 100 can be separated from the cholesteric liquid crystal layer 103, and can be adhered to the cholesteric liquid crystal layer 103. Moreover, the cholesteric liquid crystal layer 103 selectively reflects left-handed circularly polarized light having a predetermined center wavelength (for example, a red wavelength). The light-absorbing layer is provided below the cholesteric liquid crystal layer 103, and it absorbs light passing through from upper side of the cholesteric liquid crystal layer 103 to lower side thereof.

FIG. 1A shows a case of observing via the viewer 100 in which the quarter-wavelength plate 102 faces toward the cholesteric liquid crystal layer 103. In this case, natural light 111 (white light) enters into the viewer 100 (into the linearly polarizing plate 101), and passes through the linearly polarizing plate 101, and is converted into the linearly polarized light 112. This linearly polarized light 112 passes through the quarter-wavelength plate 102, and is converted into the circularly polarized light 113 (in this case, left-handed), and arrives at the cholesteric liquid crystal layer 103. The cholesteric liquid crystal layer 103 selectively reflects the left-handed circularly polarized light having a red wavelength, and therefore the cholesteric liquid crystal layer 103 selectively reflects components having a red wavelength among the circularly polarized light 113. That is, the cholesteric liquid crystal layer 103 selectively reflects the red left-handed circularly polarized light 114.

This red left-handed circularly polarized light 114 passes through the quarter-wavelength plate 102, and is converted into the linearly polarized light 115. The quarter-wavelength plate 102 converts the linearly polarized light 112 into the left-handed circularly polarized light 113, and so the left-handed circularly polarized light 114 enters into the quarter-wavelength plate 102, and it is converted into the linearly polarized light 115 having the same polarized direction as the linearly polarized light 112. The linearly polarized light 115 passes through the linearly polarizing plate 101, and therefore the red linearly polarized light 116 can be ultimately observed.

In the observation shown in FIG. 1A, if there is a part (omission of that shown in the figure) in which the cholesteric liquid crystal layer 103 does not exist, the turning direction of the circularly polarized light 113 reflecting at that part reverses. The turning direction of the reflected light is converted into the opposite direction to that of the circularly polarized light 114. Therefore, when the reflected light passes through the quarter-wavelength plate 102, the reflected light is converted into the linearly polarized light (corresponding to the linearly polarized light 115), and the polarized direction of the linearly polarized light is orthogonal to that of the linearly polarized light 115, and the linearly polarized light cannot pass through the linearly polarizing plate 101. Therefore, in the observation via the viewer 100, the reflected light from an article cannot be observed (or the intensity of the reflected light is low, so that the observation is difficult). In the observation via the viewer 100, a pattern of the cholesteric liquid crystal layer 103 appears clearly at the surface by the presence (or intensity thereof) of this reflected light and can be perceived.

On the other hand, when the viewer 100 in FIG. 1A is inverted and the same observation as in FIG. 1A is carried out, the amount of the reflected light from the cholesteric liquid crystal layer 103 decreases to 25% or less. The part looks dark (or is of a dense color), or it cannot be easily observed.

A principle of this observation is described hereinafter. In the FIG. 1B, the viewer 100 in FIG. 1A is inverted, and the linearly polarizing plate 101 thereof faces toward the cholesteric liquid crystal layer 103. In this case, a case of observing the cholesteric liquid crystal layer 103 via the viewer 100 is described.

In this case, when natural light 121 enters into the quarter-wavelength plate 102, the quarter-wavelength plate 102 influences natural light 121. However, natural light 121 includes polarized components at random, and therefore the quarter-wavelength plate 102 does not convert the polarized state. The natural light 121 passes through the quarter-wavelength plate 102 as natural light 122. When the natural light 122 passes through the linearly polarizing plate 101, the natural light 122 is converted into linearly polarized light 123. The one circularly polarized component 124 of circularly polarized components composing linearly polarized light passes through the cholesteric liquid crystal layer 103, and the other circularly polarized component 125 is reflected by the cholesteric liquid crystal layer. When the circularly polarized light 125 passes through the linearly polarizing plate 101, the circularly polarized light 125 is converted into the linearly polarized light 126, in which the amount is decreased to a half. The linearly polarized light 126 is converted into the circularly polarized light 127 by the quarter-wavelength plate 102. The amount of the circularly polarized light 127 decreases to 25% or less of the amount of entering light, so that the reflected light from the cholesteric liquid crystal layer 103 is dark and cannot be easily observed.

That is, when the viewer 100 is inverted and the observation is carried out, the reflected light from the cholesteric liquid crystal layer 103 can be easily observed, or it cannot be easily observed (or the light is remarkably strong or weak). Therefore, identification using this phenomenon can be carried out.

Moreover, according to the identification medium of the present invention, in the observation via the linearly polarizing filter, change of color (coloration) can be observed in the first liquid crystal layer changing a wavelength of light according to the rotational angle of the linearly polarizing filter. This change of color synergistically acts on optical characteristics of the cholesteric liquid crystal layer, and therefore superior identification performance can be obtained.

A principle of optical characteristics of the first liquid crystal layer is described hereinafter. FIGS. 2A and 2B are schematic views for explaining a part of the principle of the present invention. FIGS. 2A and 2B schematically show a case of observing the first liquid crystal layer (called "color-changing liquid crystal layer 204" in FIGS. 2A and 2B) via viewer 100 (optical filter) having a structure (the same structure as viewer 100 shown in FIGS. 1A and 1B) in which is laminated a linearly polarizing plate 101 and a quarter-wavelength plate 102. In the FIGS. 2A and 2B, although the linearly polarizing plate 101 is separated from the quarter-wavelength plate 102, the two closely adhere in actuality. In addition, the viewer 100 can be separated from the color-changing liquid crystal layer 204, and the viewer 100 can be adhered to the color-changing liquid crystal layer 204. Moreover, in the observation via the linearly polarizing plate, when the linearly polarizing plate is rotated around the optical axis, the color of the color-changing liquid crystal layer 204 changes to blue, green, and red in turn in the rotational range of 90°.

First, as shown in FIG. 2A, a case of observing via the viewer 100 in which the quarter-wavelength plate 102 faces toward the color-changing liquid crystal layer 204 is described hereinafter. In this case, natural light 201 enters into the linearly polarizing plate 101, and it is converted into the linearly polarized light 202. In addition, natural light 201 passes through the quarter-wavelength plate 102, and is converted into left-handed circularly polarized light 203.

When the elliptically polarized light enters into the color-changing liquid crystal layer 204, the color-changing liquid crystal layer 204 changes the ellipticity, and it rotates the direction of long axis of the elliptically polarized light. This effect is maximal when the linearly polarized light enters, and it is minimal when the circularly polarized light enters. Therefore, as shown in FIG. 2A, when the circularly polarized light 203 enters, the circularly polarized light 203 is converted into the elliptically polarized light 205 in which the ellipticity is close to 1 and in which characteristics are not very different from that of the circularly polarized light 203 even if the direction of the long axis is rotated. When the elliptically polarized light 205 is reflected by a reflecting plate 206, the phase reverses by 180°. Therefore, the elliptically polarized light 205 is converted into the elliptically polarized light 207 in which the rotational direction is opposite to that of the elliptically polarized light 205. When the elliptically polarized light 207 passes through the color-changing liquid crystal layer 204, the direction of the long axis rotates. However, the ellipticity is close to 1, and therefore the elliptically polarized light 207 is converted into the elliptically polarized light 208 similar to the circularly polarized light in which the rotational direction is opposite to that of the circularly polarized light 203. When the elliptically polarized light 208 passes through the quarter-wavelength plate 102, the elliptically polarized light 208 is converted into the elliptically polarized light 209 similar to the linearly polarized light in which the ellipticity is close to 0. The direction of the long axis of the elliptically polarized light 209 is almost orthogonal to the vibrating direction of the linearly polarized light 202, and therefore the linearly polarized light 210 passing through the linearly polarizing plate 101 is light in which the amount is small and appears dark (or it cannot be easily observed).

Next, as shown in FIG. 2B, the viewer 100 shown in FIG. 2A is inverted, and the linearly polarizing plate 101 faces toward the color-changing liquid crystal layer 204. A case of observing the color-changing liquid crystal layer 204 via the viewer 100 is described hereinafter. In this case, natural light 211 enters into the quarter-wavelength plate 102, and passes through the quarter-wavelength plate 102, and it is converted into natural light 212. The natural light includes all polarized components, and therefore the effects of optical characteristics of the quarter-wavelength plate 102 are not shown even if the natural light 211 passes through the quarter-wavelength plate 102.

When natural light 212 enters into the linearly polarizing plate 101, the natural light 212 is converted into linearly polarized light 213 and passes through the color-changing liquid crystal layer 204. The color-changing liquid crystal layer 204 changes the ellipticity of the linearly polarized light 213, and the linearly polarized light 213 is converted into the elliptically polarized light 214. At the same time, the direction of long axis of the elliptically polarized light 214 rotates. In this case, the ellipticity of the elliptically polarized light is close to 0, and therefore the influence of the rotation is great. When the elliptically polarized light 214 is reflected by the reflecting plate 206, the elliptically polarized light 214 is converted into the elliptically polarized light 215 in which the phase is changed by 180° and the elliptically polarized light 215 passes through the color-changing liquid crystal layer 204. When the elliptically polarized light 215 passes through the color-changing liquid crystal layer 204, the direction of the long axis of the elliptically polarized light 215 rotates again. The amount of this rotation differs according to the wavelength of light, so that the light passing through the linearly polarizing plate 101 is converted into different linearly polarized light 217 according to the wavelength of light. When the linearly polarized light 217 passes through the quarter-wavelength plate 102, the linearly polarized light 217 is converted into the elliptically polarized light 218. However, the amount of light is the same as that of the linearly polarized light 217. That is, the amount of light is different for each wavelength of light, and coloration is observed.

In the color-changing liquid crystal layer 204, the direction of the long axis of the elliptically polarized light is different for each wavelength of light, and therefore the observed color is different according to the angle formed by the linearly polarizing plate 101 and the color-changing liquid crystal layer 204. Therefore, when the viewer 100 is rotated by 90°, the color of the elliptically polarized light 218 changes to blue, green, and red in turn. These optical characteristics shown in FIGS. 1A and 1B and FIGS. 2A and 2B are shown in the following Table 1.

TABLE 1

|  | Cholesteric liquid crystal layer | Color-changing liquid crystal layer |
| --- | --- | --- |
| Linearly polarizing plate of the viewer faces toward this side. | Cholesteric liquid crystal layer appears at surface in non-black color and can be clearly viewed. | Color-changing liquid crystal layer does not have coloration (it is transparent). |

TABLE 1-continued

|  | Cholesteric liquid crystal layer | Color-changing liquid crystal layer |
|---|---|---|
| Linearly polarizing plate of the viewer faces toward the identification medium. Direct observation | Cholesteric liquid crystal layer appears black (or cannot be easily observed). Cholesteric liquid crystal layer appears dim in non-black color. | When the viewer is rotated, the color changes. Color-changing liquid crystal layer does not have coloration (it is transparent). |

As shown in Table 1, when the viewer having the linearly polarizing plate and the quarter-wavelength plate is prepared and the identification medium is observed via the viewer in which the quarter-wavelength plate faces toward the identification medium, the cholesteric liquid crystal layer appears at the surface in a predetermined non-black color (for example, red or green), and can be clearly viewed. In addition, the color-changing liquid crystal layer appears transparent. In the observation via the viewer, when the rotational direction of the reflected circularly polarized light from the cholesteric liquid crystal layer corresponds to that of the circularly polarized light passing through the viewer, the cholesteric liquid crystal layer appears at the surface. When the rotational direction of the reflected circularly polarized light from the cholesteric liquid crystal layer is the opposite, the cholesteric liquid crystal layer appears black even if the linearly polarizing plate of the viewer faces toward this side.

Moreover, when the identification medium is observed via the viewer in which the linearly polarizing plate faces toward the identification medium, the cholesteric liquid crystal layer appears black (or it cannot be easily viewed). In addition, the color-changing liquid crystal layer can be viewed in a color corresponding to the rotational angle of the viewer. That is, when the viewer is inverted, different patterns can be observed.

Furthermore, in a case of observing directly without the viewer, the cholesteric liquid crystal layer appears dim in a predetermined color. The reflected light around the pattern of the cholesteric liquid crystal layer can be also viewed, and therefore the cholesteric liquid crystal layer cannot be clearly viewed. Therefore, the cholesteric liquid crystal layer appears to be "dim". In this case, the color-changing liquid crystal layer is transparent, and it cannot be perceived.

In this way, when two observations using the two sides of the viewer, and direct observation without the viewer, are carried out, different pattern can be observed in each case. The differences in these patterns can be used for identification. The differences in appearance of these patterns includes differences in color, and therefore the same identification medium cannot be obtained if precise conditions (for example, material and thickness of the liquid crystal) are not the same. Therefore, counterfeiting is difficult, and superior functions for determining authenticity can be obtained.

In the identification medium of the present invention, an arrangement pattern of the first liquid crystal layer and an arrangement pattern of the cholesteric liquid crystal layer are preferably provided at the same side. According to this aspect, a pattern composed of two arrangement patterns of the first liquid crystal layer and the cholesteric liquid crystal layer can be formed, and the pattern composed of these patterns can be used for the identification.

The identification medium of the present invention further comprises an ink layer in which the color changes by temperature. According to this aspect, in addition to the above-mentioned optical characteristics, a pattern appearing (or disappearing) according to temperature can be used for the identification.

In the identification medium of the present invention, the cholesteric liquid crystal layer includes two or more cholesteric liquid crystal layers having different optical characteristic, and the two or more cholesteric liquid crystal layers have optical characteristics in which light having at least one of different wavelength and different turning direction is reflected. According to this aspect, different optical characteristics of these cholesteric liquid crystal layers, which are away from each other in the thickness direction or the side direction of the identification medium, can be used for the identification.

The identification medium of the present invention further comprises a color shift film having a structure laminating two or more light passing films in which refractive indexes of the adjoining light passing films are different. According to this aspect, when the viewing angle changes, the color shift film changes color. The change of color (effect of color shift) can be used for identification.

The identification medium of the present invention further comprises a hologram layer in which a hologram is formed. The hologram is formed by an embossment or a relief structure formed at the layer. The hologram layer is a layer used only for hologram (for example, a resin layer that is easily embossed), or is a liquid crystal layer, or is a light reflection layer. According to this aspect, the hologram image can be used for identification.

The identification medium of the present invention further comprises a fluorescent ink layer. According to this aspect, when light having a predetermined wavelength is irradiated, a pattern of the fluorescent ink layer can be clearly recognized. The pattern of the fluorescent ink can be used for identification.

The identification medium of the present invention further comprises a nematic liquid crystal layer for forming a latent image, wherein the nematic liquid crystal layer acts as a wavelength plate having a phase difference or distributed phase differences in the range of $n+(\frac{1}{2})$ to $n+(\frac{1}{4})$ times the wavelength which is used for identification (n is a natural number including 0). According to this aspect, the nematic liquid crystal layer acts as a phase difference plate of p/2 to p, and the amount of reflected light from the cholesteric liquid crystal layer can be controlled according to the phase difference. Therefore, in the observation via the viewer having a polarizing plate, a pattern of the cholesteric liquid crystal layer can be observed as an image having contrasting density. This image is a latent image observed via the viewer, and therefore superior identification performance can be obtained by using this image for the identification.

The present invention also includes an identification method for identifying the above-mentioned identification medium. That is, the identification method of the present invention comprises a first photographing step for photographing the identification medium via an identification filter in which a linearly polarizing plate and a quarter-wavelength plate are laminated and in which one side faces toward the identification medium; a second photographing step for photographing the identification medium via the identification filter in which the other side faces toward the identification medium; and a judging step for determining authenticity of the identification medium by using an image obtained in at least one of the first photographing step and the second photographing step.

The judgment is carried out as follows. The standard color image data is stored in an electronic memory, etc., and is compared with the photographed image data. A CPU (Central Processing Unit), etc., judges whether an allowable degree of similarity can be obtained.

The present invention also includes an identification apparatus for carrying out the above-mentioned identification method. That is, the identification apparatus of the present invention comprises at least one identification filter laminating a linearly polarizing plate and a quarter-wavelength plate; a first photographing apparatus for photographing the identification medium via the identification filter in which one side faces toward the identification medium; a second photographing apparatus for photographing the identification medium via the identification filter in which the other side faces toward the identification medium; and a judging means for determining authenticity of the identification medium by using an image that was photographed by at least one of the first photographing apparatus and the second photographing apparatus. In this case, the first photographing apparatus and the second photographing apparatus can be composed of one apparatus.

The present invention provides a technique in which the anticounterfeiting ability is superior and in which the identification is carried out easily and reliably.

EXPLANATION OF REFERENCE NUMERALS

300 denotes an identification medium, 301 denotes a release paper, 302 denotes an adhesive layer, 303 denotes a hologram layer, 304 denotes an aluminum deposited layer, 305 denotes a black layer, 306a denotes a cholesteric liquid crystal layer, 306b denotes a cholesteric liquid crystal layer, 307 denotes an adhesive layer, 308 denotes a color-changing liquid crystal layer, and 309 denotes a normal ink layer.

BEST MODE FOR CARRYING OUT THE INVENTION

1. First Embodiment 1-1. Composition of Embodiment

Figure 3:
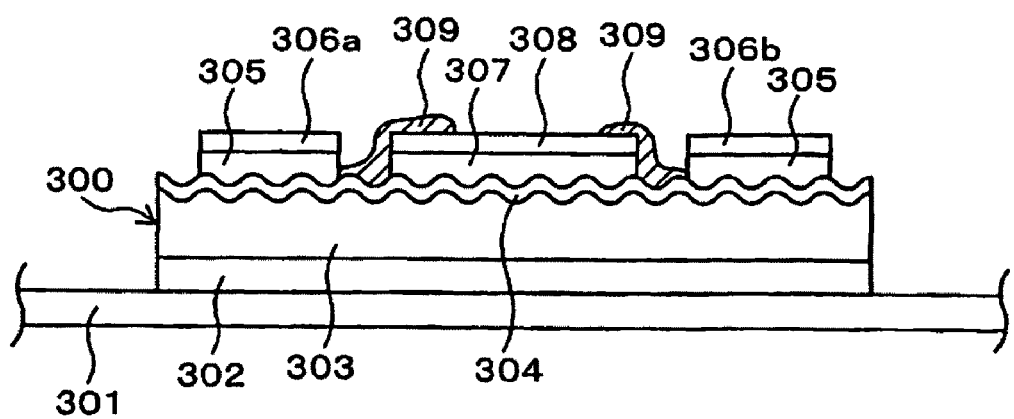
FIG. 3 is a sectional view showing a schematic structure of the identification medium of the present invention.

FIG. 3 is a sectional view showing a schematic structure of the identification medium of the present invention. FIG. 3 shows an (unused) identification medium 300 that is not affixed on an article. The identification medium 300 has a structure in which an adhesive layer 302 is provided at the inside (adhesive side) of a hologram layer 303 and in which an aluminum deposited layer 304 is provided at the outside (observed side) thereof. The adhesive layer 302 is composed of an adhesive material, and it is used for fixing the identification medium 300 on the article to be identified. A release paper (separator) 301 is placed on the exposure side (adhesive side) of the adhesive layer 302. When the identification medium 300 is placed on the article, this release paper is peeled off and the adhesive layer 302 is exposed, and the exposure side contacts the surface of the article.

The hologram layer 303 is formed by a resin material, and it is given a relief structure for displaying the hologram. When an embossing type is pressed on the hologram layer 303, this relief structure is formed. The aluminum deposited layer 304 acts as a light reflection layer reflecting visible light, and it is provided on (at the observed side of) the hologram layer 303. A cholesteric liquid crystal layer 306a and a cholesteric liquid crystal layer 306b are provided via a black layer 305 on the aluminum deposited layer 304. The difference between the cholesteric liquid crystal layer 306a and the cholesteric liquid crystal layer 306b is a center wavelength of reflection light. A color-changing liquid crystal layer 308 is provided via an adhesive layer 307 on the aluminum deposited layer 304.

The black layer 305 acts as a light absorbing layer absorbing light passing through the cholesteric liquid crystal layer 306. The adhesive layer 307 is transparent, and it is used for fixing the color-changing liquid crystal layer 308 to the aluminum deposited layer 304.

The cholesteric liquid crystal layer 306 and the color-changing liquid crystal layer 308 have a predetermined pattern composing patterns. A normal ink layer (printed layer) 309 is provided at gaps among the patterns of the cholesteric liquid crystal layers 306a and 306b and the pattern of the color-changing liquid crystal layer 308, and it is provided over a part of the color-changing liquid crystal layer 308.

1-2. Manufacture Method of Embodiment

The cholesteric liquid crystal layer 306 can be formed by printing a liquid crystal ink that is sold commercially. A product by Wacker Chemie AG can be used as this liquid crystal ink. The color-changing liquid crystal layer 308 can be obtained by the following manufacture method.

For example, a solution including a liquid crystal material is spread on an orientating substrate, and after the twisted nematic orientation is carried out, the orientation structure of liquid crystal molecules is fixed in the state of the liquid crystal. As the liquid crystal material, both a high molecular liquid crystal and a low molecular liquid crystal, in which liquid crystal molecules can be orientated to the twisted nematic structure, can be used. Furthermore, a method for fixing the orientation structure of liquid crystal molecules is as follows. When the high molecular liquid crystal having a glass transition temperature of 70° C. or more is used as a liquid crystal material, the high molecular liquid crystal is quickly cooled after the high molecular liquid crystal was orientated to the twisted nematic structure in the state of the liquid crystal. Moreover, when the low molecular liquid crystal is used for a liquid crystal material, the low molecular liquid crystal is cross-linked by irradiation of radiation after the low molecular liquid crystal was orientated to the twisted nematic structure in the state of the liquid crystal.

As the high molecular liquid crystal, for example, main chain high molecular liquid crystal of polyester series, polyamide series, polycarbonate series, polyimide series, etc., and side chain high molecular liquid crystal of polyacrylate series, polymethacrylate series, polymalonate series, polysiloxane series, etc., are preferable. In addition, as a component unit of the high molecular, for example, a unit of aromatic or aliphatic diol, a unit of aromatic or aliphatic dicarboxylic acid, and a unit of aromatic or aliphatic hydroxy carboxylic acid are preferable.

Moreover, as the low molecular liquid crystal, for example, a liquid crystal compound having a reactive functional group at the end of saturated benzenecarboxylic acid derivatives, unsaturated benzenecarboxylic acid derivatives, biphenylcarboxylic acid derivatives, aromatic hydroxycarboxylic acid derivatives, Schiff base derivatives, bis-azomethine compound derivatives, azo compound derivatives, azoxy compound derivatives, cyclohexane ester compound derivatives, sterol compound derivatives, etc., and a compound to which is added a cross-linking compound in a liquid crystal compound of compound derivatives, are preferable.

Furthermore, when the orientation structure in the state of the liquid crystal is fixed by heat or light cross-linking, liquid crystal materials having a heat or light cross-linking functional group or part are preferable. As the cross-linking functional group, for example, acrylic group, methacrylic group, vinyl group, vinyl ether group, allyl group, allyloxy group, epoxy group such as glycidyl group, etc., isocyanate group, isothiocyanate group, azo group, diazo group, azido group, hydroxyl group, carboxyl group, low ester group, etc., are preferable. In particular, acrylic group and methacrylic group are further preferable. In addition, as the cross-linking part, parts having distributed structure of maleimide, maleic anhydride, cinnamic acid, cinnamic acid ester, alkene, diene, allene, alkyne, azo, azoxy, disulfide, polysulfide, etc., are preferable. Moreover, these cross-linking groups and cross-linking parts can be included in the liquid crystal substance composing liquid crystal material, or non-liquid crystal substance having these cross-linking groups and cross-linking parts can be added to liquid crystal material.

Furthermore, the solution including such a liquid crystal material preferably further includes an optically active compound for orientating liquid crystal molecules to the twisted nematic structure in the liquid crystal state. As the optically active compound, an optically active low molecular compound or a high molecular compound is preferable. Although any optically active compounds can be used for the present invention, an optical active liquid crystal compound is preferable from the viewpoint of solubility in the high molecular liquid crystal.

Moreover, in order to spread easily, a well-known surfactant can be appropriately added in the solution including the liquid crystal material. Furthermore, in order to improve heat-resistance characteristics of the liquid crystal layer, a cross-linking agent such as a bisazide compound, glycidyl methacrylate, etc., can be added in the solution including the liquid crystal material, and cross-linking is carried out in the post-processing.

Moreover, the solvent used for adjusting the solution including such a liquid crystal material is not particularly limited. For example, a halogenated hydrocarbon such as chloroform, dichloroethane, tetrachloroethane, trichloroethylene, tetrachloroethylene, ortho dichlorobenzene, etc., a solvent mixture thereof and phenols, a polar solvent such as dimethylformamide, dimethylacetamide, dimethylsulfoxide, N-methylpyrrolidone, sulfolane, cyclohexane, etc., are preferable. These solvents can be appropriately selected and used according to the kind of the liquid crystal material, and can be appropriately mixed and used, if necessary. Moreover, the concentration of the solution can be appropriately selected according to molecular weight and the solubility, etc., of the liquid crystal material.

Furthermore, as the orientating substrate, films such as polyimide, polyamide, polyamideimide, polyphenylene sulfide, polyphenylene oxide, polyether ketone, polyether ether ketone, polyether sulfone, polysulfone, polyethylene terephthalate, polyethylene naphthalate, polyarylate, triacetylcellulose, epoxy resin, phenolics, etc., or a uniaxially oriented film of these films can be used. Depending on the manufacturing method, these films have sufficient ability to orientate the liquid crystal material even if these films are not subjected to orientation processing. However, when the orientation is insufficient or the orientating ability is not exhibited, a drawing processing under moderate heating, a rubbing processing rubbing the film plane in one direction with rayon cloth, etc., a rubbing processing providing an orientating film which is composed of a well-known orientating agent such as polyimide, polyvinyl alcohol, and silane coupling agents on the film, an oblique vaporization processing of silicon oxides, etc., and a processing properly combining these processings, can be appropriately applied to the film, if necessary.

The spreading method is not particularly limited if the solution is uniformly spread on an orientating substrate, and a well-known method can be properly adopted. As the spreading method, for example, roll coating, die coating, dip coating, curtain coating, spin coating, etc., can be used. Moreover, dry processing such as using a heater, blowing warm air, etc., can be employed after the solution is spread.

Moreover, after liquid crystal molecules are fixed on the orientating substrate, only the color-changing liquid crystal layer can be obtained by a method of flaking off mechanically by using rolls in the interface between the orientating substrate and the color-changing liquid crystal layer, a method of flaking off mechanically after soaking in a poor solvent for all structural materials, a method of flaking off by employing ultrasonic waves in the poor solvent, a method of flaking off by applying a temperature based on differences between the coefficient of thermal expansion of the orientating substrate and that of the color-changing liquid crystal layer, a method of dissolving the orientating substrate itself or the orientation film on the orientating substrate, etc.

1-3. Identification Function of Embodiment

Figure 4A:
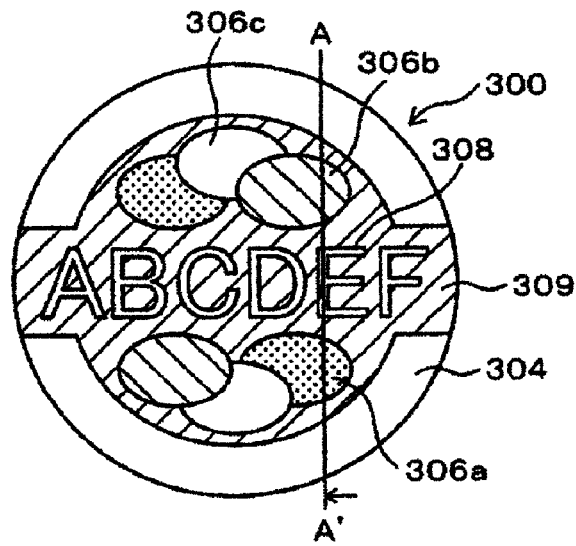
FIGS. 4A to 4C are elevation views showing appearances of the identification medium of the present invention.
Figure 4B:
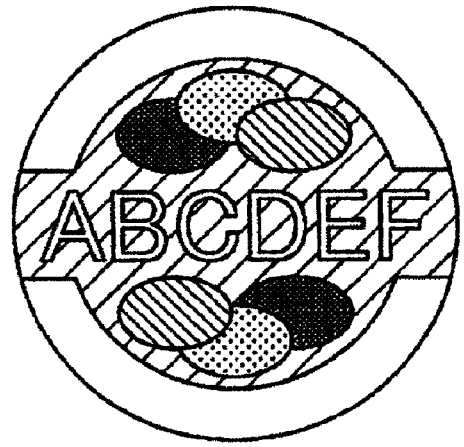
Figure 4C:
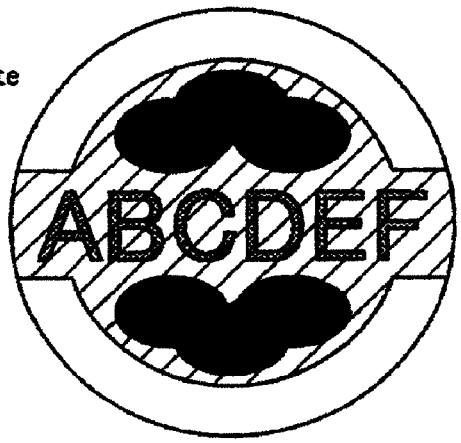

One example of the identification function of the identification medium shown in FIG. 3 is described. FIGS. 4A to 4C are schematic views showing one example of appearances in a case of observing the identification medium 300 shown in FIG. 3 from the front side (upper side of FIG. 3). The cross section cut at the line of A-A' shown in FIG. 4A is shown in FIG. 3.

Figure 1A:
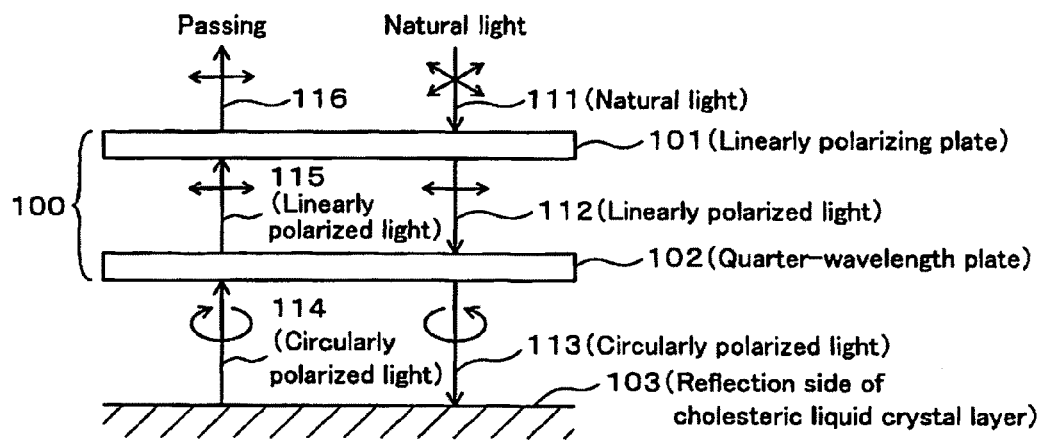
FIGS. 1A and 1B are schematic views for explaining a part of the principle of the present invention.
Figure 2A:
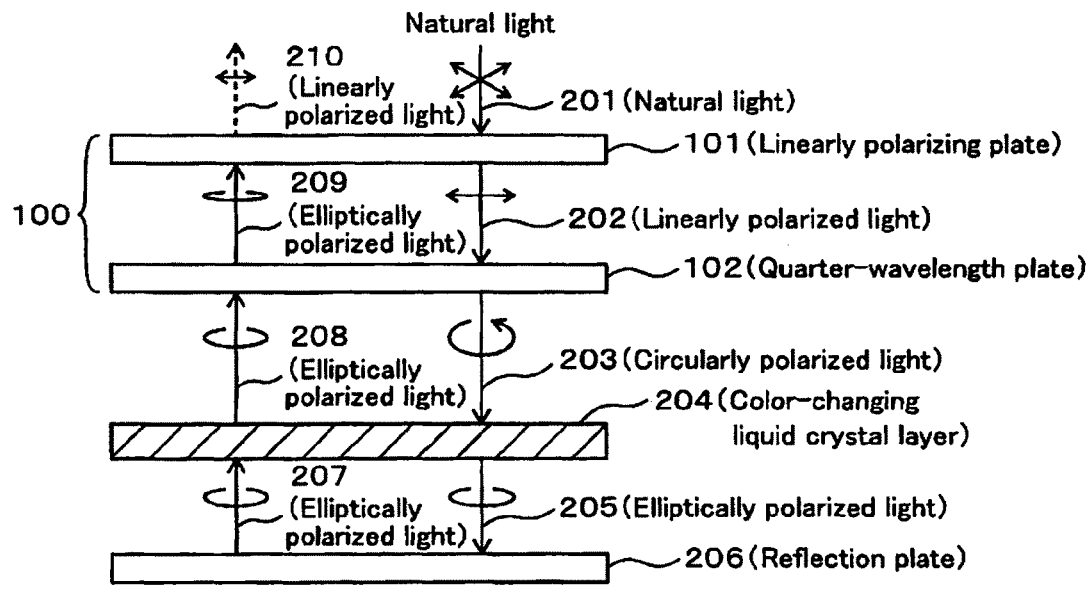
FIGS. 2A and 2B are schematic views for explaining a part of the principle of the present invention.

FIG. 4A shows the appearance in a case of directly observing the identification medium without use of the viewer 100 shown in FIGS. 1A and 2A. FIG. 4B shows an appearance in a case of observing the identification medium 300 via the viewer 100 in which the linearly polarizing plate 101 faces toward this side (observer side) and in which the quarter-wavelength plate 102 faces toward the identification medium 300. FIG. 4C shows an appearance in a case of observing the identification medium 300 via the viewer 100, in which the quarter-wavelength plate 102 faces toward this side (observer side), and in which the linearly polarizing plate 101 faces toward the identification medium 300.

In a case of direct observation, as shown in FIG. 4A, the aluminum deposited layer 304 showing the hologram pattern appears to have a metallic sheen. The aluminum deposited layer 304 is formed along the relief structure of the hologram layer 303 shown in FIG. 3, so that the aluminum deposited layer 304 is observed as the pattern of reference numeral 304 shown in FIG. 4A. Moreover, cholesteric liquid crystal layers 306a to 306c appear dimly (slightly unclearly) in a predetermined color. This is because a predetermined color circularly polarized light reflected at cholesteric liquid crystal layers 306a to 306c is mixed with surrounding reflected light and is observed. In this example, the cholesteric liquid crystal layer 306a reflects red left-handed circularly polarized light, and the cholesteric liquid crystal layer 306b reflects green left-handed circularly polarized light, and the cholesteric liquid crystal layer 306c reflects yellowish green left-handed circularly polarized light.

Moreover, in a case of direct observation, as shown in FIG. 4A, the character pattern of the color-changing liquid crystal layer 308 is observed as the hologram pattern. In a case of direct observation, the color-changing liquid crystal layer 308 is transparent, so that the reflected light from the aluminum deposited layer 304 (refer to FIG. 3) is observed as the character pattern shown in FIG. 4A. Moreover, in a case of direct observation, a normal ink layer 309 is observed as shown in FIG. 4A. In this example, the normal ink layer 309 has blue ink.

Figure 1B:
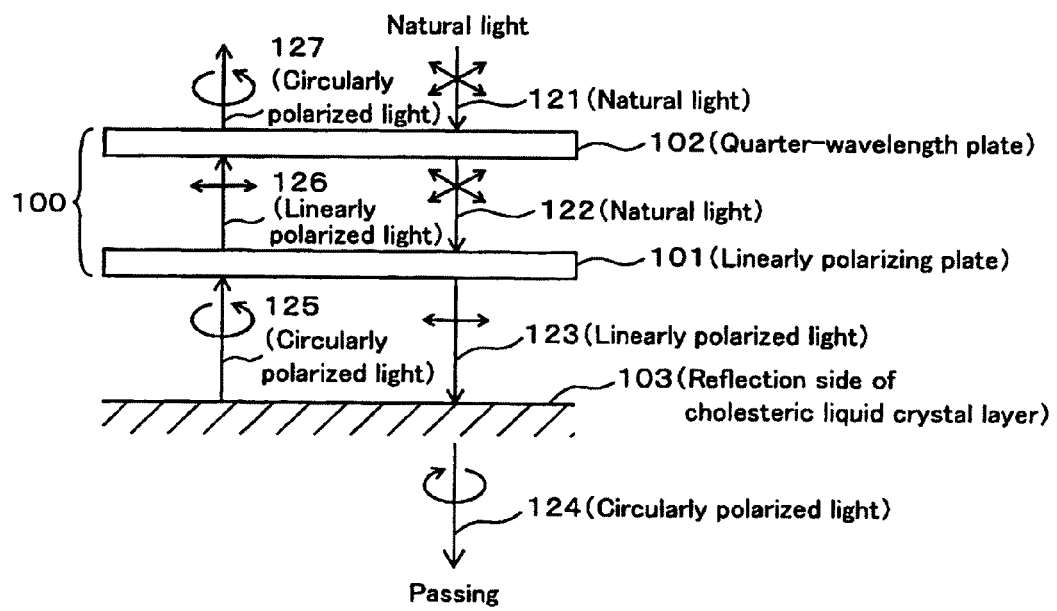

Next, in a case of observing the identification medium 300 shown in FIG. 4A via the viewer 100 shown in FIGS. 1A and 1B, one example of appearances is described. First, a case of observing the identification medium 300 via the viewer 100 in which the linearly polarizing plate 101 faces toward this side (observer side), and in which the quarter-wavelength plate 102 faces toward the identification medium 300, is described.

In this case, according to the principle shown in FIG. 1A, the cholesteric liquid crystal layers 306a to 306c clearly appear at the surface compared with the case of FIG. 4A. Moreover, according to the principle shown in FIG. 2A, the color of the color-changing liquid crystal layer 308 is not perceived, and the character pattern of the color-changing liquid crystal layer 308 is more observed to be darker than in the case of FIG. 4A. In addition, the amount of light in the viewer 100 decreases, and therefore the aluminum deposited layer 304 and the normal ink layer 309 appear to be darker than compared with the case of FIG. 4A.

Next, in a case of observing the identification medium 300 shown in FIG. 4A via the viewer 100 shown in FIGS. 1A and 1B, one example of the appearance is described. In this case, the identification medium 300 is observed via the viewer 100 in which the linearly polarizing plate 101 faces toward the identification medium 300, and in which the quarter-wavelength plate 102 faces toward this side (observer side).

Figure 2B:
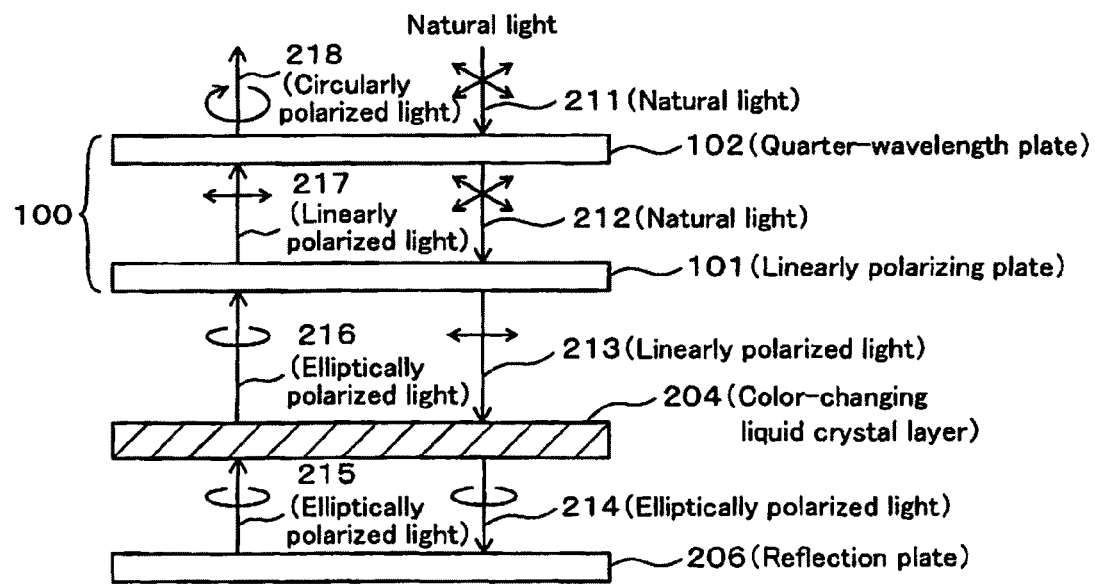

In this case, according to the principle shown in FIG. 1B, the predetermined color reflected light from the cholesteric liquid crystal layers 306a to 306c is not observed (or is not readily visible), and the incident light to the cholesteric liquid crystal layers 306a to 306c passes therethrough and is absorbed at the black layer 305. Therefore, the cholesteric liquid crystal layers 306a to 306c appear to be a black pattern or a dark pattern. Moreover, according to the principle shown in FIG. 2B, the color-changing liquid crystal layer 308 appears to be the color corresponding to the rotational angle of the viewer 100. That is, when the viewer 100 is rotated, the color of the character pattern of the color-changing liquid crystal layer 308 shown in FIG. 4C changes. For example, when the viewer 100 is rotated around an optical axis, the color of the character pattern of the color-changing liquid crystal layer 308 changes to blue, green, and red in the rotational range of 90°. The aluminum deposited layer 304 and the normal ink layer 309 appear to be dark compared with the case of FIG. 4A.

Thus, when the identification medium 300 is observed via the viewer (optical filter) laminating the linearly polarizing plate and the quarter-wavelength plate, the observed pattern of the cholesteric liquid crystal layers 306a to 306c changes to a predetermined color, or to black by reversing the inside and outside of the viewer. Moreover, the observed pattern of the color-changing liquid crystal layer 308 changes to a hologram display of the character pattern, or to a color display changing by the angle of the viewer. The authenticity of the identification medium 300 can be determined by using the change in this appearance. Because this change is clear, superior identification characteristics can be obtained.

2. Second Embodiment

Figure 5:
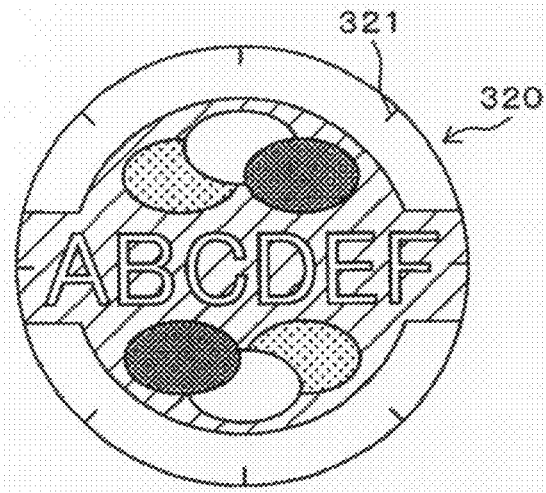
FIG. 5 is an elevation view showing another identification medium of the present invention.

The present embodiment relates to a technique in which reuse of the identification medium 300 shown in FIGS. 4A to 4C is difficult. FIG. 5 is an elevation view showing the identification medium of another embodiment. The identification medium 320 shown in FIG. 5 has a radial gap 321 in the surrounding of at least one layer in the identification medium 300 shown in FIGS. 4A to 4C. According to this composition, when the identification medium 320 is peeled off the article for which the authenticity is to be determined, the identification medium 320 is torn from the gap 321, and reuse of the identification medium 320 is difficult. Therefore, reuse (and misuse) of the identification medium 320 by those with illicit intentions is difficult.

3. Third Embodiment

In the composition shown in FIG. 3, the black layer 305 can be replaced with a structure in which is laminated a black ink layer having a pattern or a character and a temperature sensitive ink layer thereon which is black or dense in color at a room temperature (for example, at a temperature of 30° C. or less), and which is transparent at a high temperature (for example, at a temperature of 45° C. or more). In this case, the same appearance as the case of FIG. 3 is shown at the room temperature, and the pattern or the character of the black ink appears at the surface at the high temperature. Furthermore, when the pattern or the character is composed of black ink and a pale color ink, the pattern or the character further appears at the surface. Thus, when ink materials changing the color or the permeability depending on the temperature is combined with the composition of the present invention, more complex optical characteristic can be obtained.

4. Fourth Embodiment 4-1. Composition of Embodiment

Figure 6:
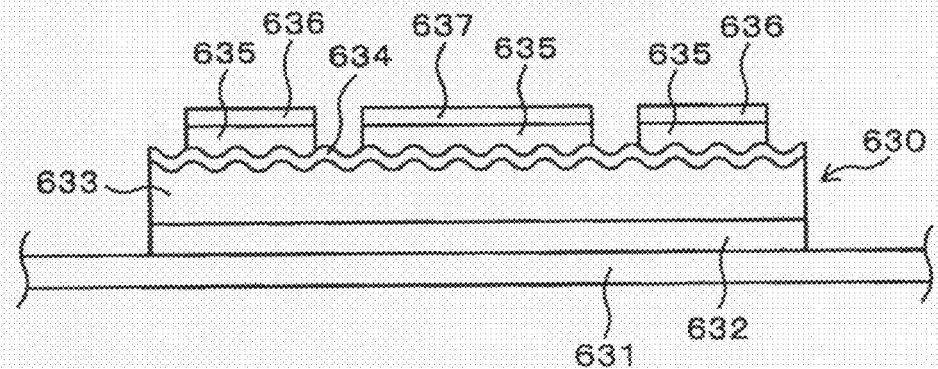
FIG. 6 is a sectional view showing a schematic structure of the other identification medium of the present invention.

FIG. 6 is a cross-sectional view showing a structure in another embodiment. The cross-sectional structure of the identification medium 630 is shown in FIG. 6. The identification medium 630 has a composition in which a black adhesive layer 632 is provided at the backside of a hologram layer 633 composed of a transparent resin. The black adhesive layer 632 acts as a light-absorbing layer. A release paper (separator) 631 is provided at the backside of the black adhesive layer 632. When the identification medium 630 is affixed on the article, the separator 631 is peeled off and the exposure side of the black adhesive layer 632 contacts the surface of the article.

The cholesteric liquid crystal layer 634 is formed by ink of a cholesteric liquid crystal, and the cholesteric liquid crystal layer 634 is provided at the front side of the hologram layer 633 (observed side). In this example, the cholesteric liquid crystal layer 634 has a layer structure along the relief structure of the hologram layer 633 therebelow. An adhesive layer 635, which is composed of a transparent resin, is provided on the cholesteric liquid crystal layer 634. Moreover, the cholesteric liquid crystal layer 636 and the color-changing liquid crystal layer 637 are provided on the adhesive layer 635. The laminated structure of the adhesive layer 635 and the color-changing liquid crystal layer 637, and the laminated structure of the adhesive layer 635 and the cholesteric liquid crystal layer 636 are formed in a predetermined pattern. Moreover, the cholesteric liquid crystal layer 634 selectively reflects green left-handed circularly polarized light, and the cholesteric liquid crystal layer 636 selectively reflects red right-handed circularly polarized light. In the combination of the optical characteristics of two cholesteric liquid crystal layers, only the turning direction of the reflected light can be different, and only the center wavelength of the reflected light can be different.

In this example, the relief structure for forming the hologram can be directly formed in the cholesteric liquid crystal layer 634 by using a hologram model without using the hologram layer 633. In this case, the hologram layer 633 is unnecessary.

4-2. Identification Function of Embodiment

When the identification medium 630 shown in FIG. 6 is directly viewed, only the cholesteric liquid crystal layer 634 appears as a green hologram pattern in the part in which the cholesteric liquid crystal layer 634 can be directly viewed. In addition, the part in which the cholesteric liquid crystal layer 634 and the cholesteric liquid crystal layer 636 overlap each other appears as a yellow hologram pattern.

When the identification medium 630 is observed via the viewer 100 shown in FIGS. 1A and 1B and FIGS. 2A and 2B, it appears as follows. First, when the identification medium 630 is observed via the viewer 100 in which the linearly polarizing plate 101 faces toward this side (observer side), green left-handed circularly polarized light from the cholesteric liquid crystal layer 634 can be observed according to the principle shown in FIG. 1A. In this case, because the viewer 100 intercepts red right-handed circularly polarized light from the cholesteric liquid crystal layer 636, the pattern of the cholesteric liquid crystal layer 636 looks black.

When the identification medium 630 is observed via the viewer 100 in which the inside and outside is reversed, the cholesteric liquid crystal layers 634 and 636 appear black or darker and the color-changing liquid crystal layer 637 appears the color corresponding to the rotational angle of the viewer 100 according to the principle shown in FIG. 1B.

Moreover, when the identification medium 630 is observed via a viewer in which the direction of the linearly polarizing plate 101 and the quarter-wavelength plate is different from the viewer 100 by 90° and in which the linearly polarizing plate 101 faces toward this side (observer side), another appearance can be further observed. That is, in this case, because the turning direction of the circularly polarized light passing through the viewer is reversed, red right-handed circularly polarized light from the cholesteric liquid crystal layer 636 can be observed according to the principle shown in FIG. 1A. In this case, the viewer 100 intercepts green left-handed circularly polarized light from the cholesteric liquid crystal layer 634, and therefore the pattern of the exposed cholesteric liquid crystal layer 634 appears to be black.

Moreover, in this case, when the identification medium 630 is observed via the viewer which is inverted and in which the quarter-wavelength plate faces toward this side, the cholesteric liquid crystal layers 634 and 636 appear to be black or darker, and the color-changing liquid crystal layer 637 appears to be the color corresponding to the rotational angle of the viewer.

Thus, in the present embodiment, appearances of the cholesteric liquid crystal layer and the color-changing liquid crystal layer clearly change by reversing the inside and outside of the viewer. Identification using the change of this appearance can be carried out.

5. Fifth Embodiment

Figure 7:
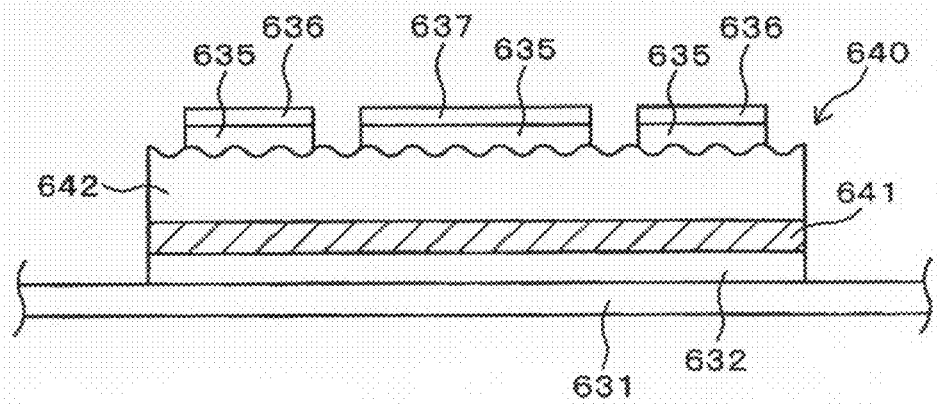
FIG. 7 is a sectional view showing a schematic structure of the other identification medium of the present invention.

The identification medium can also have a structure combining the cholesteric liquid crystal layer, the color-changing liquid crystal layer, and the color shift film. FIG. 7 shows a cross-sectional structure of the present embodiment. In the identification medium 640 shown in FIG. 7, a color shift film 641 is provided on the black adhesive layer 632 acting as a light absorbing layer and an adhesive layer, and a hologram layer 642 composed of a transparent resin material is provided on the color shift film 641. Moreover, the adhesive layer 635 and the cholesteric liquid crystal layer 636, the adhesive layer 635 and the color-changing liquid crystal layer 637 is formed with a predetermined pattern on the hologram layer 642.

The color shift film 641 has a laminated structure in which optical transparent thin films having a different refractive index from each other are laminated in a multilayer. For example, the color shift film has a structure in which an optical transparent thin film (A layer) having the first refractive index and an optical transparent thin film (B layer) having the second refractive index are alternately laminated in a multilayer.

When white light enters into the color shift film, the reflection of light is generated in the interface of each layer according to the Fresnel reflection rule. That is, in the interface between the A layer and the B layer, a part of incident light is reflected, and the rest passes through. This is because the refractive index in the A layer and the refractive index in the B layer are different. The interface between the A layer and the B layer appears repeatedly, and therefore the reflected light, which is generated at each interface, interferes. When the incident angle of incident light is gradually increased, an optical path difference of the reflected light that is generated in each interface gradually decreases, and light of shorter wavelengths interferes and reinforces each other. Therefore, when the color shift film in which white light enters is more obliquely viewed (from an almost parallel angle thereto), the light of the shorter wavelengths seems to reflect strongly, and the reflected light gradually appears bluer. This phenomenon is called a color shift. The incident angle is defined as an angle formed by a perpendicular to the plane of incidence and an optical axis of incident light.

According to this composition, in addition to the optical characteristic using the principle shown in FIGS. 1A and 1B and FIGS. 2A and 2B, when the viewing angle is changed, the color shift that color shift film 641 exhibits can be observed. Moreover, the cholesteric liquid crystal layer 636 also exhibits the color shift, and therefore both overlapped color shifts can be observed. Moreover, these color shifts are observed as changes of color in the hologram pattern (or the hologram image). Therefore, the appearance is complex, and superior identification performance can be obtained.

6. Sixth Embodiment

The pattern can be printed on the cholesteric liquid crystal layer or the color-changing liquid crystal layer by fluorescent ink. According to this composition, the pattern of the fluorescent ink appears at the surface by irradiating light of suitable wavelength (for example, black light), and it can be used for identification.

7. Seventh Embodiment

In the identification medium using the present invention, a nematic liquid crystal layer for forming a latent image can be provided on the cholesteric liquid crystal layer or thereabove, in which the nematic liquid crystal layer acts as a wavelength plate having a phase difference or distributed phase differences in the range of $n+(½)$ to $n+(¼)$ times of a wavelength which is used for the identification (n is a natural number including 0).

According to this composition, a latent image that cannot be directly observed (or is not readily visible) can be observed via an optical filter (for example, the viewer shown in FIGS. 1A and 1B or FIG. 2A and FIG. 2B) having the polarizing plate. In particular, the nematic liquid crystal layer having the distributed phase differences can form a latent image having a contrasting density. Therefore, further superior identification performance can be obtained.

8. Eighth Embodiment

8-1. Composition of Embodiment

Figure 8:
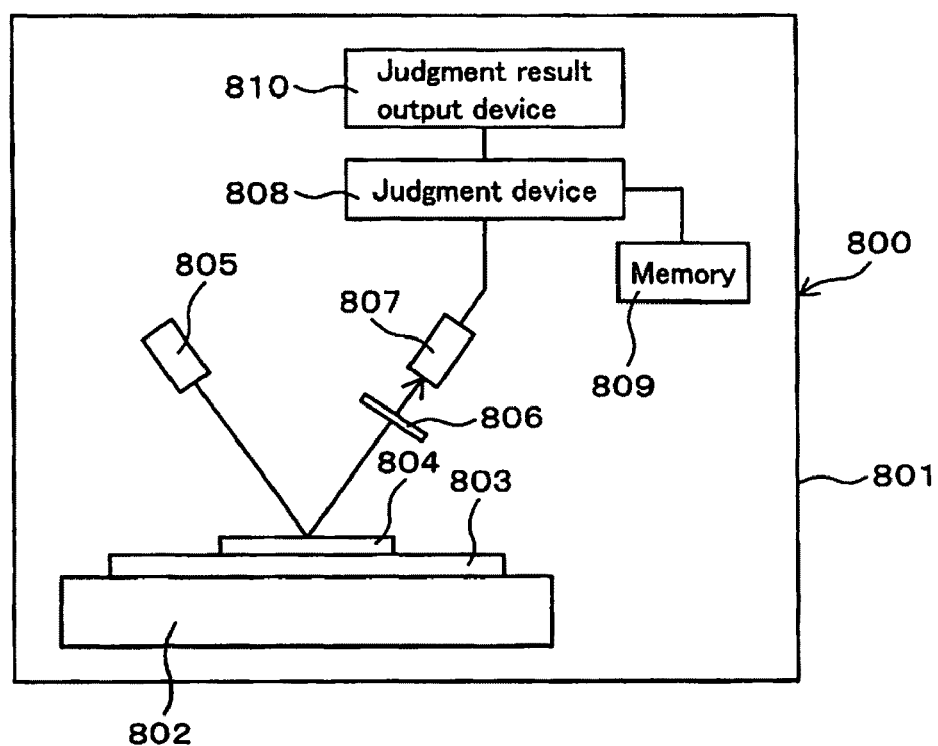
FIG. 8 is a schematic view of the identification apparatus.

An example of the apparatus identifying the identification medium using the present invention and an action example of the apparatus is described hereinafter. FIG. 8 is a schematic view showing one example of the identification apparatus. The identification apparatus 800 shown in FIG. 8 has a stage 802 in which the article to be identified is placed in an apparatus case 801. In FIG. 8, an identification card 803 is placed on the stage 802. An identification medium 804 having the same structure as the first embodiment is placed on the identification card 803.

The identification apparatus 800 has a lamp 805 for irradiating light onto the identification medium 804 and a CCD camera 807. The lamp 805 generates white natural light that does not have uniform wavelength components or uniformly polarized components. The CCD camera 807 photographs the identification medium 804 illuminated by the lamp 805. In this case, an optical filter 806 is inserted between the identification medium 804 and the CCD camera 807. The optical filter 806 has the same composition as the viewer 100 shown in FIGS. 1A and 1B and FIGS. 2A and 2B. The identification apparatus has a mechanism that can reverse the inside and outside of the optical filter 806 and can withdraw the optical filter 806 from a space between the identification medium 804 and the CCD camera 807.

The image data photographed by the CCD camera 807 is output to a judgment device 808. The judgment device 808 reads the standard image data that is stored in a memory 809, and compares that with the image data output from the CCD camera 807. When the difference in pixel data is more than a predetermined level, the judgment device 808 determines that the identification medium 804 is an imitation (a counterfeit). When this is not so, the judgment device 808 determines that the identification medium 804 is authentic. This judgment result is output to a judgment result output device 810.

The judgment result output device 810 has a buzzer, a lamp, or a liquid crystal display, etc., and outputs the judgment result out of the identification apparatus. For example, the judgment result output device 810 has a composition that turns on a red lamp when the identification medium 804 is determined to be an imitation and turns on a blue lamp when the identification medium 804 is determined to be authentic.

In the present embodiment, an example of the identification apparatus having only one photographing device and one viewer is described. However, the identification apparatus can have at least one of plural photographing devices and plural viewers and can properly select those according to the condition of the observation.

8-2. Action of Embodiment

An action example of the identification apparatus 800 is described hereinafter. First, the image data of the authentic identification medium 804 is stored as the standard image data in a memory 809. Here, with the image data photographed in a state in which the optical filter 806 is withdrawn, that is, the image data when the identification medium 804 is directly photographed, the image data photographed via the optical filter 806 in which one side faces toward the identification medium 804, and the image data photographed via the optical filter 806 in which the other side faces toward the identification medium 804, are stored as the standard image data in the memory 809.

In the identification operation, the article (in this case, the identification card 803) having the identification medium 804 is placed on the stage 802. Next, in a state in which the optical filter 806 is withdrawn from the interval between the identification medium 804 and the CCD camera 807, white natural light is irradiated from the lamp 805 onto the identification medium 804, and the identification medium 804 is photographed by the CCD camera 807. This photographed image data is output to the judgment device 808, and it is temporarily stored in the memory 809.

Next, the optical filter 806 is arranged between the identification medium 804 and the CCD camera 807, and one side of the optical filter 806 faces toward the identification medium 804. Then, white natural light is irradiated from the lamp 805 onto the identification medium 804, and the CCD camera 807 photographs the identification medium 804 via the optical filter 806. This photographed image data is also temporarily stored in the memory 809.

Next, the inside and outside of the optical filter 806 is reversed, and the other side of the optical filter 806 faces toward the identification medium 804. Then, white natural light is irradiated from the lamp 805 to the identification medium 804, and the CCD camera 807 photographs the identification medium 804 via the optical filter 806. This photographed image data is also temporarily stored in the memory 809.

Then, the photographed image data and the corresponding standard image data are read from the memory 809, and the judgment device 808 compares the standard image data with the photographed image data under three photographing conditions. In the three photographing conditions, when the photographed images are respectively corresponding to the standard images, the judgment device 808 outputs the judgment result for authenticity. Moreover, under the three photographing conditions, when at least one of the photographed images is not corresponding to the standard image, the judgment device 808 outputs the judgment result that it is an imitation.

These judgment results from the judgment result output device 810 are output out of the identification apparatus 800 as user-recognizable information.

The invention claimed is:

1. An identification medium which is observed via a linearly polarizing filter, comprising:
 a first liquid crystal layer for changing a wavelength of light according to a rotational angle of the linearly polarizing filter;
 a cholesteric liquid crystal layer; and
 a light absorbing layer provided below the cholesteric liquid crystal layer,
 wherein the first liquid crystal layer includes a reflection layer and at least one twisted nematic liquid crystal layer,
 wherein the twisted nematic liquid crystal layer includes liquid crystal molecules in which a product of a birefringent value and a spiral pitch is at least 3.5 times greater than the wavelength of light having a wavelength of 400 to 800 nm, and the twisted nematic liquid crystal layer does not cause a selective reflection by Bragg diffraction and also satisfies a Mauguin condition, in which a linearly polarized light passes through the twisted nematic liquid crystal layer in parallel or perpendicularly to long axes of the liquid crystal molecules and also passes along a spiral structure of the liquid crystal molecules with the linearly polarized light maintained in a polarized state.

2. The identification medium according to claim 1, wherein an arrangement pattern of the first liquid crystal layer and an arrangement pattern of the cholesteric liquid crystal layer are provided at the same side.

3. The identification medium according to claim 1, further comprising:
 a layer in which a gap is formed.

4. The identification medium according to claim 1, further comprising:
 an ink layer in which the color changes by temperature.

5. The identification medium according to claim 1, wherein the cholesteric liquid crystal layer includes two or more cholesteric liquid crystal layers having different optical characteristic, and
 wherein the two or more cholesteric liquid crystal layers have an optical characteristic that light having at least one of different wavelength and different turning direction is reflected.

6. The identification medium according to claim 1, further comprising:
 a color shift film having a structure laminating two or more light passing films in which refractive indexes of the adjoining light passing films are different.

7. The identification medium according to claim 1, further comprising:
 a hologram layer in which a hologram is formed.

8. The identification medium according to claim 1, further comprising:
 a fluorescent ink layer.

9. The identification medium according to claim 1, further comprising:
 the twisted nematic liquid crystal layer for forming a latent image, wherein the twisted nematic liquid crystal layer includes a phase difference or distributed phase differences in the range of $n+(1/2)$ to $n+(1/4)$ times the wavelength which is used for the identification (n is a natural number including 0).

* * * * *